US011073600B2

(12) United States Patent
Hellinger

(10) Patent No.: US 11,073,600 B2
(45) Date of Patent: Jul. 27, 2021

(54) RADAR SENSOR

(71) Applicant: Robert Bosch GmbH, Stuttgart (DE)

(72) Inventor: Raphael Hellinger, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 16/225,900

(22) Filed: Dec. 19, 2018

(65) Prior Publication Data

US 2019/0195986 A1 Jun. 27, 2019

Related U.S. Application Data

(60) Provisional application No. 62/609,608, filed on Dec. 22, 2017.

(51) Int. Cl.
| H01Q 1/32 | (2006.01) |
| G01S 7/03 | (2006.01) |
| G01S 7/02 | (2006.01) |
| H01Q 1/42 | (2006.01) |
| G01S 13/931 | (2020.01) |

(52) U.S. Cl.
CPC ........... *G01S 7/032* (2013.01); *H01Q 1/3233* (2013.01); *G01S 7/027* (2021.05); *G01S 13/931* (2013.01); *H01Q 1/42* (2013.01)

(58) Field of Classification Search
CPC .... H01Q 1/3233; H01Q 1/325; H01Q 1/3283; H01Q 1/3291; H01Q 1/42; H01Q 1/421; H01Q 1/422; H01Q 1/424; H01Q 1/425; H01Q 1/427; H01Q 1/32–3291; G01S 7/032; G01S 13/931; G01S 2007/027; G01S 2013/9327; G01S 2013/93271; G01S 2013/93272; G01S 2013/93275; B65D 2588/12; F17C 2270/01; F17C 2270/0102; F17C 2270/0134; F17C 2270/0142; F17C 2270/0165; F17C 2270/0186

See application file for complete search history.

(56) References Cited

U.S. PATENT DOCUMENTS

| 4,597,146 A | 7/1986 | Larin |
| 4,673,937 A * | 6/1987 | Davis ............... G01S 13/931 342/72 |
| 5,411,140 A * | 5/1995 | Byer ................ B65D 21/0202 206/459.5 |
| D376,367 S | 12/1996 | Mailandt |
| 6,184,842 B1 | 2/2001 | Leinweber et al. |
| 6,328,358 B1 | 12/2001 | Berweiler |
| 6,496,138 B1 | 12/2002 | Honma |
| 6,628,226 B2 * | 9/2003 | Suzuki ............... G01S 7/032 342/70 |
| 6,674,412 B1 | 1/2004 | Schmidt et al. |
| 6,677,065 B2 | 1/2004 | Blauer |
| 7,226,187 B2 | 6/2007 | Yamazaki et al. |

(Continued)

*Primary Examiner* — Andrea Lindgren Baltzell
*Assistant Examiner* — Patrick R Holecek
(74) *Attorney, Agent, or Firm* — Michael Best & Friedrich LLP

(57) ABSTRACT

A vehicular system includes a body panel having an aperture and a radar unit at least partially aligned with the aperture. The radar unit includes a housing encapsulating a printed circuit board operable to generate radar waves. The housing includes a first wall through which the radar waves are directed. The first wall of the housing is visible within the aperture and the body panel does not extend across the first wall.

15 Claims, 8 Drawing Sheets

(56) References Cited

U.S. PATENT DOCUMENTS

| | | |
|---|---|---|
| 7,295,166 B2 | 11/2007 | Fujii et al. |
| 7,508,353 B2 | 3/2009 | Shingyoji |
| 7,538,734 B2 | 5/2009 | Fujii et al. |
| 7,619,575 B2 | 11/2009 | Kamiya et al. |
| 7,990,334 B2 | 8/2011 | Maeda et al. |
| 8,130,167 B2 | 3/2012 | Glabe et al. |
| 8,252,379 B2 | 8/2012 | Nagashima |
| 8,286,816 B2 * | 10/2012 | Cheng .................. H05K 5/0239 220/4.02 |
| 8,287,990 B2 | 10/2012 | Maeda et al. |
| 8,487,820 B2 | 7/2013 | Tajima |
| 8,702,135 B2 | 4/2014 | Gaboury et al. |
| 8,816,932 B2 | 8/2014 | Kawaguchi et al. |
| 8,974,712 B2 | 3/2015 | Ohtake et al. |
| 9,114,760 B2 | 8/2015 | Mayer Pujadas |
| 9,157,986 B2 | 10/2015 | Waldschmidt et al. |
| 9,233,650 B2 | 1/2016 | Yoshinaga et al. |
| 2003/0052810 A1 | 3/2003 | Artis et al. |
| 2008/0128068 A1 | 6/2008 | Gastaldi et al. |
| 2013/0050034 A1 * | 2/2013 | Wu .......................... H01Q 1/42 343/713 |
| 2014/0091969 A1 | 4/2014 | Shi et al. |
| 2014/0093665 A1 | 4/2014 | Horibe et al. |
| 2014/0218263 A1 | 8/2014 | Burdenski et al. |
| 2015/0086731 A1 | 3/2015 | Sugiura et al. |
| 2015/0123854 A1 * | 5/2015 | Chakam ............... H01Q 1/3275 343/702 |
| 2015/0140259 A1 | 5/2015 | Sugiura et al. |
| 2016/0111776 A1 | 4/2016 | Okumura et al. |
| 2016/0248152 A1 | 8/2016 | Takao et al. |
| 2016/0261034 A1 * | 9/2016 | Geise ................... B29C 67/246 |

* cited by examiner

RADAR SENSOR

CROSS REFERENCE TO RELATED APPLICATIONS

This application claims the benefit of U.S. Provisional Patent Application No. 62/609,608, filed Dec. 22, 2017, the entire contents of which are incorporated herein by reference.

BACKGROUND

The present invention relates to radar sensors, and more specifically to housings for radar sensors.

SUMMARY

In one embodiment, the invention provides a vehicular system that includes a body panel having an aperture and a radar unit at least partially aligned with the aperture. The radar unit includes a housing encapsulating a printed circuit board operable to generate radar waves. The housing includes a first wall through which the radar waves are directed. The first wall of the housing is visible within the aperture and the body panel does not extend across the first wall.

In another embodiment the invention provides a radar unit including a housing having a first housing portion and a second housing portion. The first and second housing portions are releasably attached to one another. The radar unit further includes a printed circuit board operable to generate radar waves and encapsulated between the first and second housing portions. The radar waves are directed through the first housing portion. The first housing portion includes an exterior surface with an indicia formed thereon.

Other aspects of the invention will become apparent by consideration of the detailed description and accompanying drawings.

DETAILED DESCRIPTION

Figure 1:
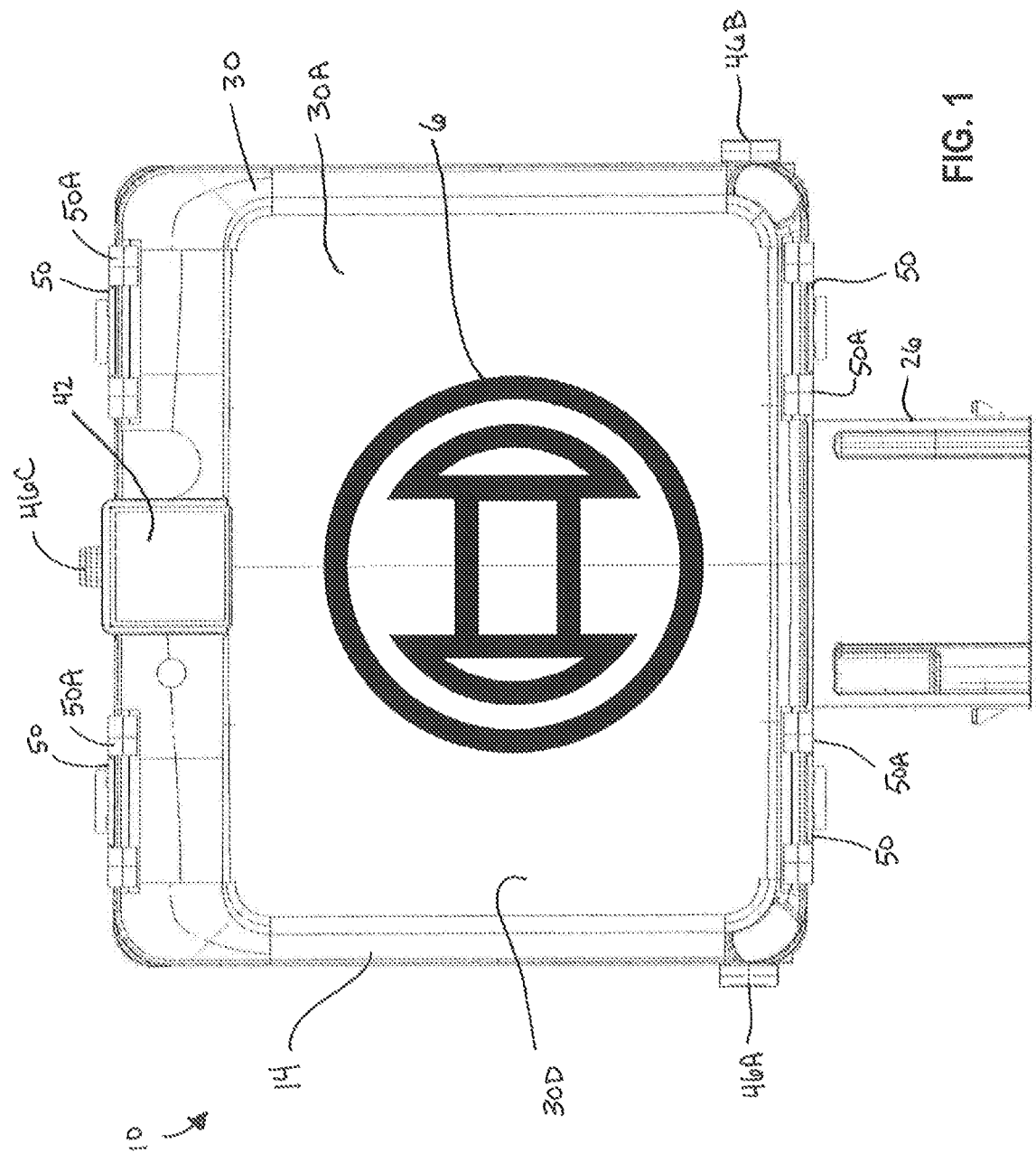
FIG. 1 is a front view of a radar unit embodying the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A radar sensor or unit 10 includes a housing 14 for enclosing various radar sensor components, including a first printed circuit board (PCB) 18 for the radar and a second printed circuit board 22 for power control. One of the first and second circuit boards 18, 22 may include electrical components such as an antenna and a receiver (not shown). The second printed circuit board functions as an interface between the first printed circuit board 18 and a vehicle connector port 26. The vehicle connector port 26 is connected to an engine control unit (not shown) for power and data transfer.

The radar sensor housing 14 includes a first or front cover (first housing portion) 30, a sub-carrier (third housing portion) 34, and a second or rear cover (second housing portion) 38. Regardless of mounting orientation within the vehicle (i.e., facing the front of the vehicle, the rear of the vehicle, a side of the vehicle, etc.), the front cover 30 is the portion of the housing 14 through which the radar waves are primarily directed from the radar PCB 18 and through which returning radar waves reach the radar PCB 18. For example, if the radar sensor housing 14 is positioned to assist with forward collision detection or adaptive cruise control in a vehicle, the front cover 30 is positioned between the radar PCB 18 and the detected vehicle in front of the vehicle. If the radar sensor housing 14 is positioned to assist with rear cross traffic alert, the front cover 30 is positioned between the radar PCB 18 and the detected vehicle behind the vehicle.

The front cover 30 includes a first wall 30A having a generally planar exterior surface or front surface 30D. The front surface 30D of the front cover 30 is the surface of the housing 14 (and the surface of the front cover 30) through which the radar waves are primarily directed by the radar PCB 18. The front cover 30 extends across the entirety of the radar PCB 18 and, as shown, at least partially encapsulates the radar PCB 18. As shown, the front cover 30 includes posts 30B for directly supporting the radar PCB 18. The front cover 30 further supports a mirror 42 that may be used for alignment purposes. The front cover is attachable to the sub-carrier 34 by fasteners (e.g., threaded fasteners such as screws, etc.), a snap-engagement feature (such as the spring clips 50 or an alternative feature), or both.

Figure 3:
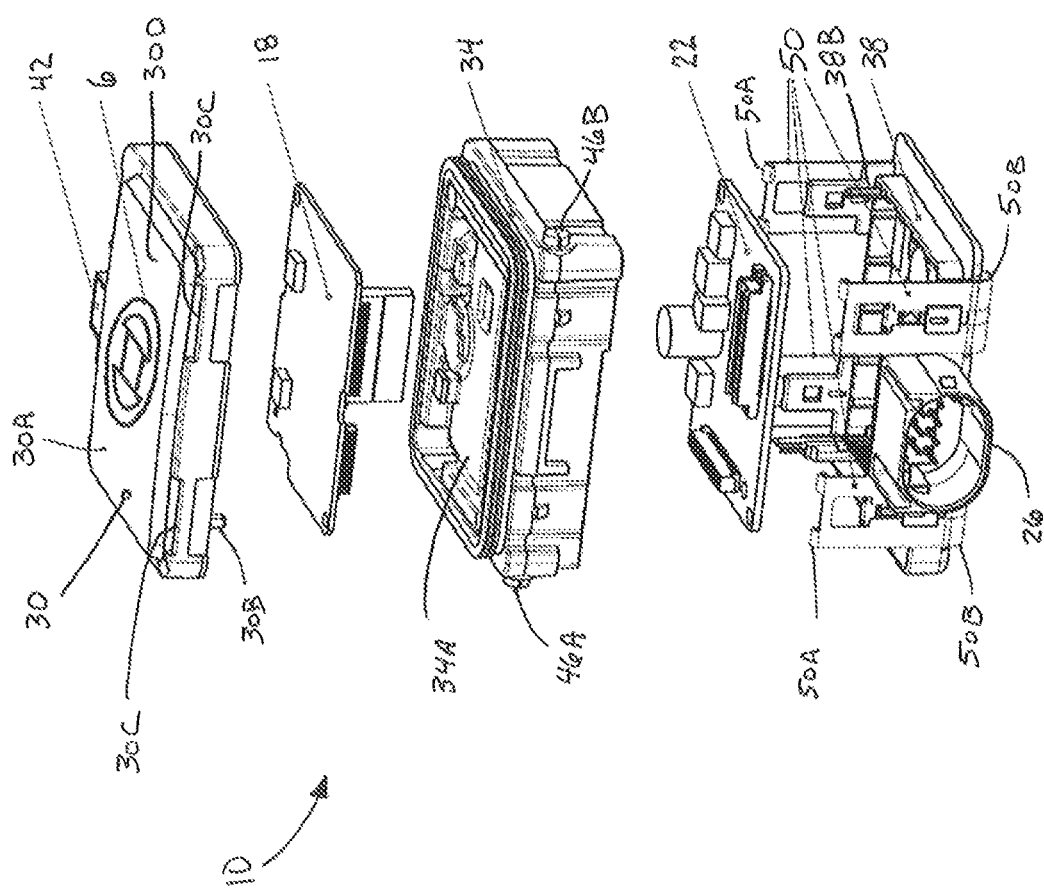
FIG. 3 is an exploded view of the radar unit.

The sub-carrier 34 and the rear cover 38 collectively form the remainder of the housing 14. The sub-carrier 34 is rectangular and includes space within for at least partially housing both of the first and second printed circuit boards 18, 22. As shown in FIG. 3, the sub-carrier 34 includes an intermediate wall 34A that separates the two PCBs 18, 22 from one another. The intermediate wall 34A includes various openings through which the two PCBs 18, 22 interface with one another.

The sub-carrier 34 further includes three projections, boss features or cylindrical posts 46A, 46B, 46C that extend outwardly from the rectangular sides of the sub-carrier 34. The posts 46A, 46B, 46C interact (e.g., snap fit) with mating surfaces as described in greater detail below with respect to FIGS. 5-8.

Figure 2:
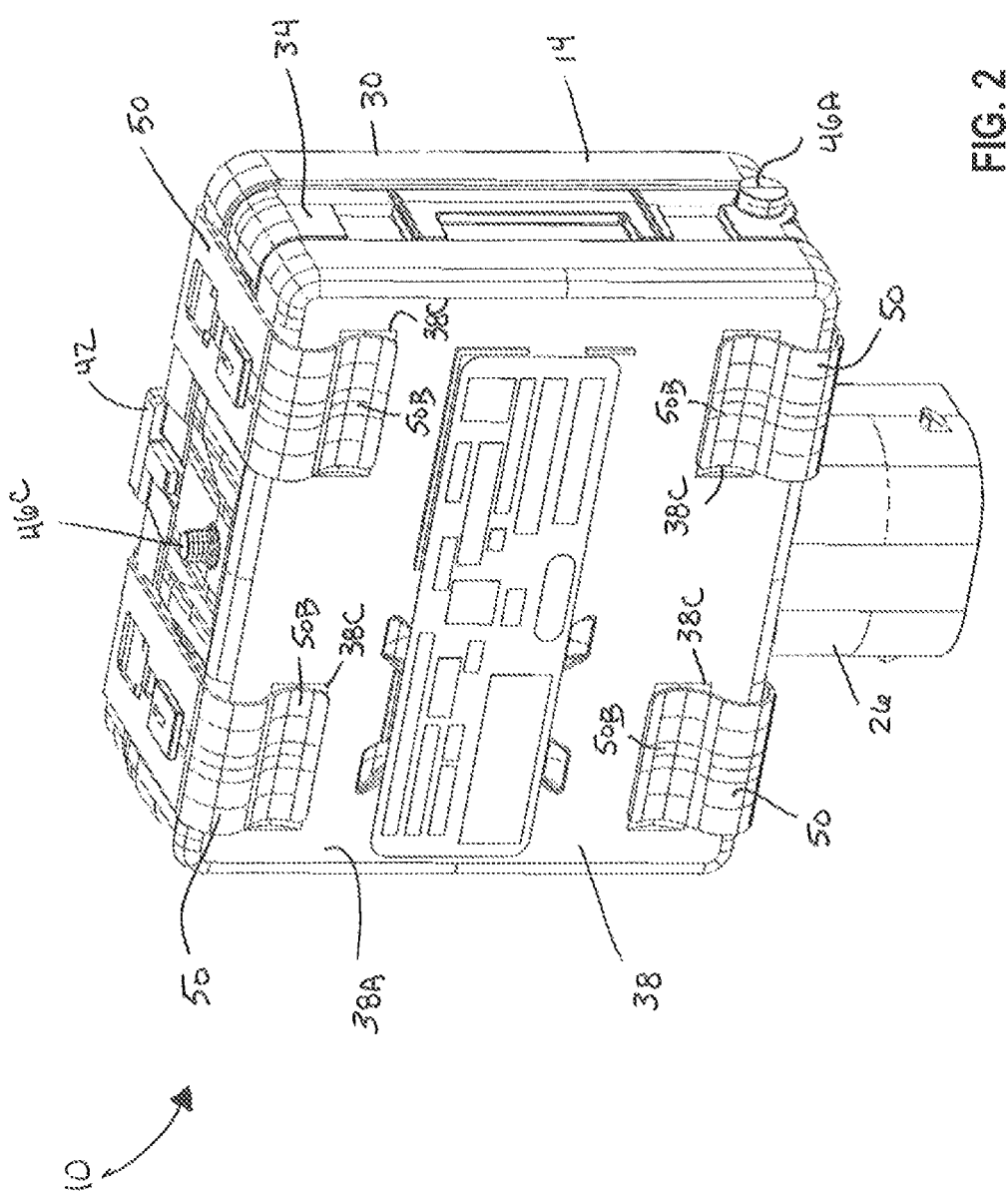
FIG. 2 is a rear perspective view of the radar unit of FIG. 1.

The rear cover 38 is located opposite the front cover 30 and includes a second wall 38A having a rear, outward facing surface 38D (FIG. 2) that is generally planar. The radar waves generated by the radar unit 10 are directed from the radar PCB 18 away from the rear surface 38D. The rear surface 38D includes four depressions 38C for engaging with a snap engagement feature (e.g., the spring clips 50). The rear cover 38 is attached to or is integrally molded with the vehicle connector port 26. The rear cover 38 at least partially encapsulates the power PCB 22, and includes posts 38B for supporting the power PCB 22.

The housing 14 is held together via the four spring clips 50. More particularly, the spring clips 50 releasably attach the front cover 30, the sub-carrier 34, and the rear cover 38 together in a closed position in which the radar PCB 18 and the power PCB 22 are enclosed within the housing 14. Each spring clip 50 includes a first clip end 50A for engaging a lip 30C of the front cover 30, and a second clip end 50B for engaging the depressions 38C on the rear cover 38.

To assemble the radar unit 10, the power PCB 22 is placed within the rear cover 38, and more specifically is located on the mounting posts 38B located on the rear cover 38. The sub-carrier 34 is placed over the rear cover 38. The radar PCB 18 is mounted to the posts 30B of the front cover 30 and is electrically attached to the power PCB 22 through the sub-carrier 34. With the front cover 30, sub-carrier 34, and rear cover 38 sandwiched together, the first clip end 50A of each spring clip 50 is placed within the lip 30C of the front cover 30. The flexibility of the spring clip 50 permits the second clip end 50B to extend over the rear cover 38 and into the respective depression 38C formed thereon, thereby securing the front cover 30, sub-carrier 34, and rear cover 38 together relative to one another.

The rear cover 38 and the sub-carrier 34 may be formed as a single unit, with the front cover 30 being removable to provide access therein. Alternatively, the sub-carrier 34 and the front cover 30 may be formed as a single unit, with the rear cover being removable to provide access therein. Further still, the orientation of the radar unit 10 may be modified such that the front cover 30 is not removable to access the radar PCB 18 and/or power PCB 22. In other words, the front cover 30 may not be the access point for inserting and removing the PCBs 18, 22.

Figure 4:
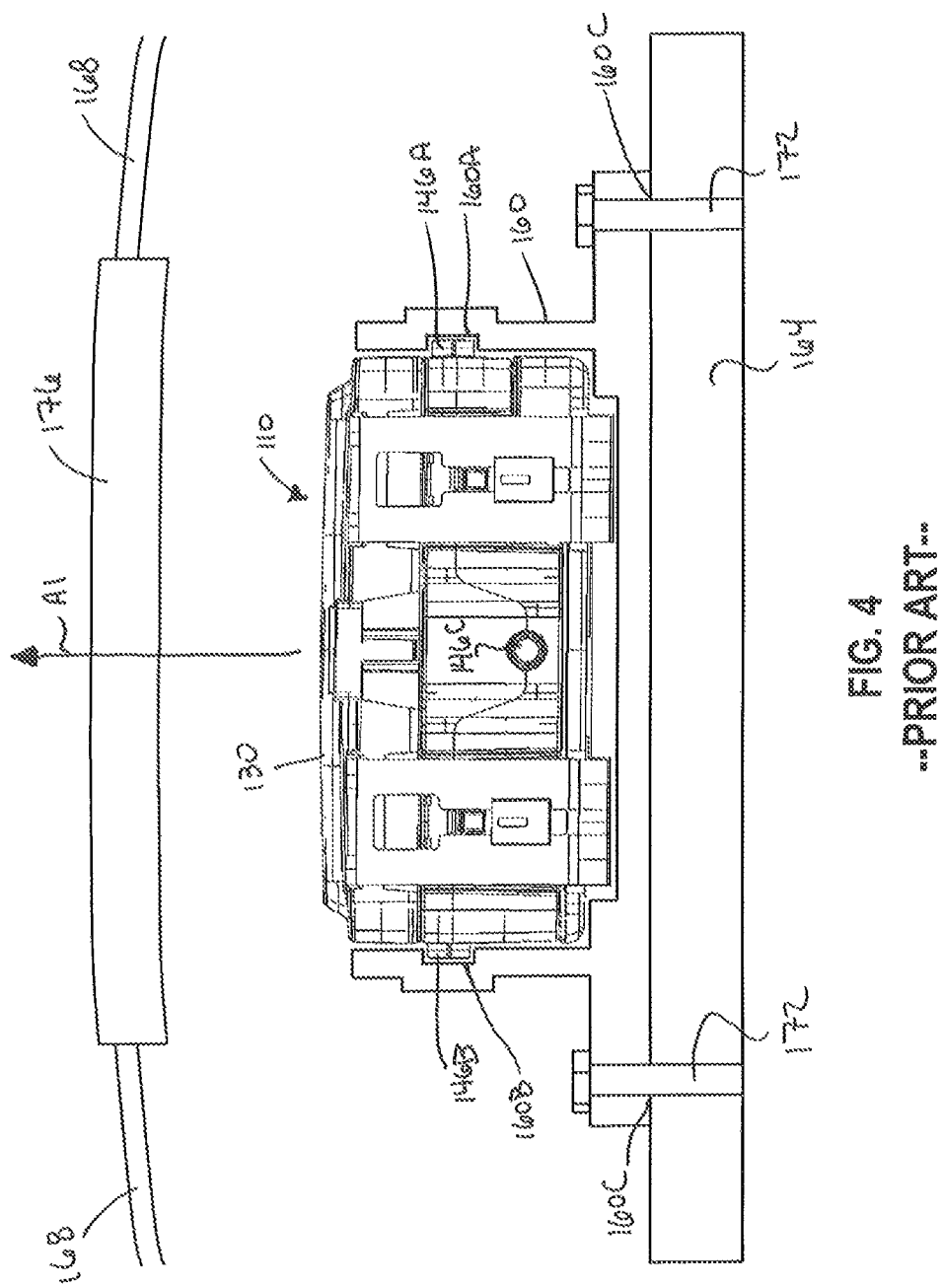
FIG. 4 is a top view of a mounted radar sensor relative to a vehicle body panel according to the prior art.

As shown in FIG. 4, according to the prior art, mounting a radar unit 110 for use with a vehicle includes mounting the radar unit 110 to a bracket 160 by engaging the bracket 160 with at least some of the cylindrical posts 146A, 146B, 146C that are located on the radar unit 110. The bracket 160 flexes to extend around the posts 146A, 146B, 146C and receives the posts within similarly sized cutouts or recesses 160A, 160B. The bracket 160 is mounted to a structural member 164 (e.g., bumper beam), located behind an external body panel 168 (e.g., a panel, a grill, a fascia, etc.), at mounting points 160C via fasteners 172 (e.g., threaded fasteners). A radome 176, separate from the radar unit 110 (i.e., not housing a radar or power PCB) is mounted to the body panel 168, is spaced apart from the radar unit 110, and is located between the radar unit 110 and the surroundings of the vehicle. More specifically, the radome 176 is located between the front cover 130 of the radar unit 110 and the exterior of the vehicle. Stated another way, when the radar unit 110 emits radar waves, the radar waves pass through the front cover 130 of the radar unit 110, through the radome 176, and to the exterior of the vehicle. The radome 176 provides clear transmission of radar waves therethrough. Waves emitted by radar unit 110 are directed in the direction annotated by arrow A1.

Within the art, a front cover of a radar unit may be referred to as a radome. For clarity within the context of this application, the term "radome" does not refer to the cover or housing of a radar unit, but only refers to a separate part or shroud placed in front of a radar unit.

As shown in FIG. 1, the radar unit 10 is provided with indicia 6. More specifically, the front surface 30D of the front cover 30 of the radar unit 10 is provided with the indicia 6. The indicia 6 may be a logo corresponding to the manufacturer of the radar unit 10, a logo corresponding to the vehicle make or model with which the radar unit 10 is associated, informational text or imagery denoting an aspect of the vehicle (e.g., trim level, engine specification, horse-power output), informational text or imagery denoting the function of the radar unit 10, and/or a custom indicia based on customer or client request. The indicia 6 may be formed onto or into the front surface 30D of the front cover 30 (e.g., molded, engraved, embossed, etc.) and may be colored to stand out relative to the remainder of the front surface and/or relative to the surrounding body panel. Alternatively, the front surface may be colored with the indicia 6 left uncolored. In some embodiments, the coloring may match a body color of the surrounding vehicle body panel 68. By incorporating the indicia 6 directly onto the housing 14 of the radar unit 10, no separate radome is needed to provide aesthetic appeal to, or otherwise conceal, the radar unit 10.

The radar units 10 are tested and calibrated by the manufacturer to provide optimal emittance of the radar waves through the housing 14. Forming the indicia 6 directly on the housing 14 of the radar unit 10 is performed prior to calibrating the unit 10. Therefore, the radar unit 10 is calibrated to account for the geometrical irregularities (e.g., indents, protrusions, etc.) in the housing 14 formed by the indicia 6. Further, without the need for any separate radome, the calibration of the radar unit 10 can be completed prior to installation in or on the vehicle.

Figure 5:
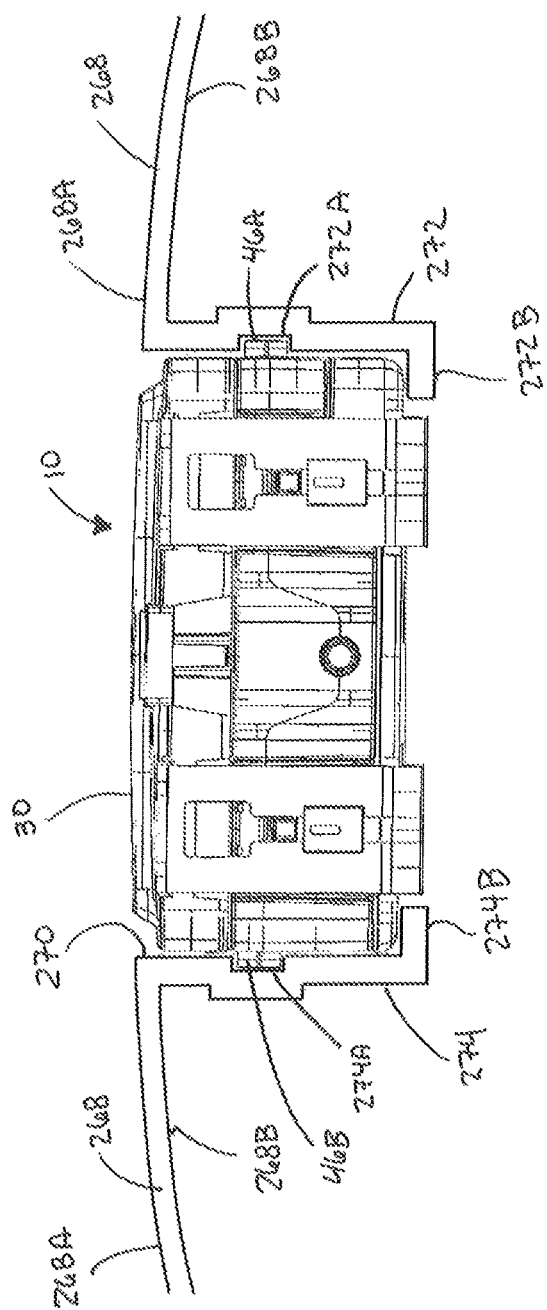
FIG. 5 is a top view of a mounted radar unit according to one aspect of the invention.

FIG. 5 illustrates a first mounting arrangement where the radar unit 10 is prominently displayed within a body panel 268 (e.g., a panel, a grill, a fascia). More specifically, the front cover 30 and the indicia 6 (see FIG. 1) located thereon are prominently displayed within the body panel 268 when viewed from outside of the vehicle. As shown, the body panel 268 includes an external side 268A (visible from outside the vehicle) and an internal side 268B (hidden from view from outside the vehicle). The body panel 268 further includes an aperture 270 sized to accept the radar unit 10 or at least sized to permit viewing of the front cover 30 or a portion of the front cover 30 of the radar unit 10. In other words, the aperture 270 is at least partially aligned with the first wall 30A of the front cover 30 of the radar unit 10. The aperture 270 is defined on multiple sides by inwardly extending portions 272, 274 that are integrally molded with the remainder of the body panel 268. The inwardly extending portions 272, 274 engage with the posts 46A, 46B to support the radar unit 10 within the body panel 268. More specifically, the inwardly extending portions 272, 274 include cutouts, recesses, or mounting points 272A, 274A that engage with the posts 46A, 46B by flexing the inwardly extending portions 272, 274 until the posts 46A, 46B are seated within the recesses 272A, 274A. Though not shown, the aperture 270 may further be defined by a third side (and/or a fourth side) with a third inwardly extending portion for engaging with the third post 46C located on the radar unit 10. In some constructions, the inwardly extending portions 272, 274 further include flanges or shoulders 272B, 274B to seat against the rear cover 38. Though not shown, the inwardly extending portions can additionally or alternatively include flanges or shoulders adjacent the front cover 30 if the installation of the radar units 10 is performed from the internal side 268B of the body panel 268.

The front cover 30 is generally aligned with the external side 268A of the body panel 268 to be flush with and lie in the same plane as the exterior surface of the body panel 268. Alternatively, the front cover 30 may be recessed or may protrude from the external side 268 of the body panel 268. At least a portion of the front cover 30 of the installed radar unit 10 is visible from outside of the vehicle to reveal the indicia 6 and is not shrouded by a radome, or covered by a grill, or a body panel. In other words, the body panel does not extend across the first wall 30A (i.e., of the front cover 30). Nor is there any radome/aesthetic cover over the front cover 30 of the housing 14.

Figure 6:
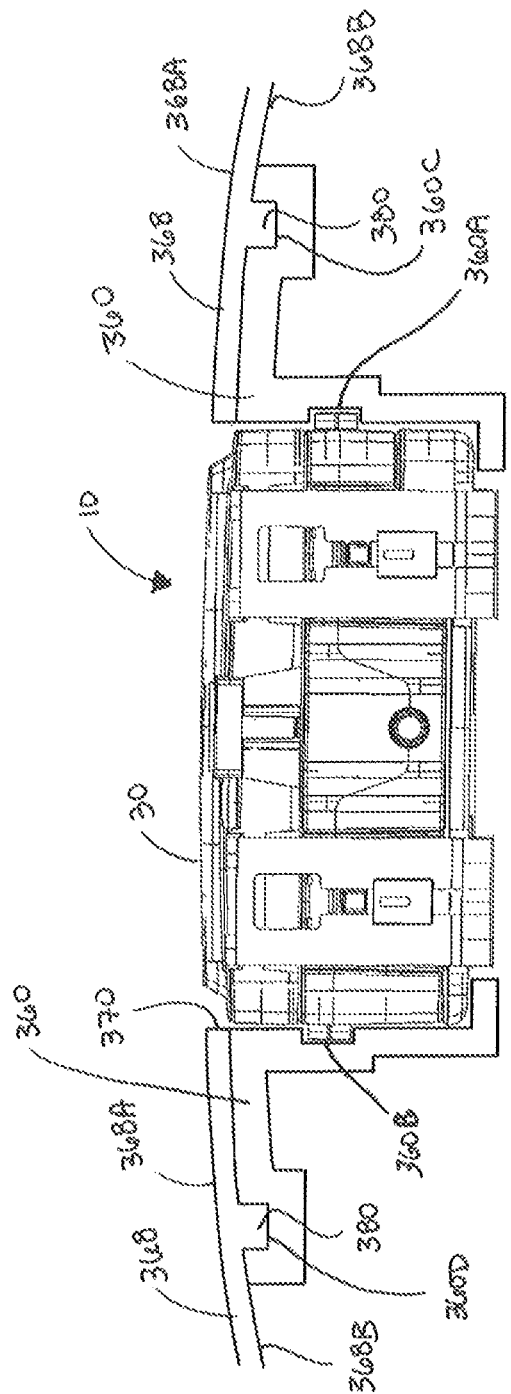
FIG. 6 is a top view of a mounted radar unit according to another aspect of the invention.

FIG. 6 illustrates a second mounting arrangement for mounting the radar unit 10 within an aperture 370 in a body panel 368, similar to the first mounting arrangement described above with respect to FIG. 5. The body panel 368 does not include inwardly extending portions for mounting to the radar unit 10. Rather, the body panel 368 includes attachment points 380 located on an internal side 368B of the body panel 368. The attachment points 380 may include, for example, snap features, clips, or other attachment structures that do not extend to an external side 368A of the body panel 368 (e.g., not screws, etc.). The attachment points 380 mate with attachment points or cutouts 360C, 360D on a bracket 360. The bracket 360 further includes cutouts or mounting points 360A, 360B that interact with the radar unit 10 for mounting the radar unit 10 to the bracket 360 (similar to the cutouts 272A, 274A). Therefore, the radar unit 10 is mounted within the aperture 370 to the body panel 368 via the bracket 360.

Figure 7:
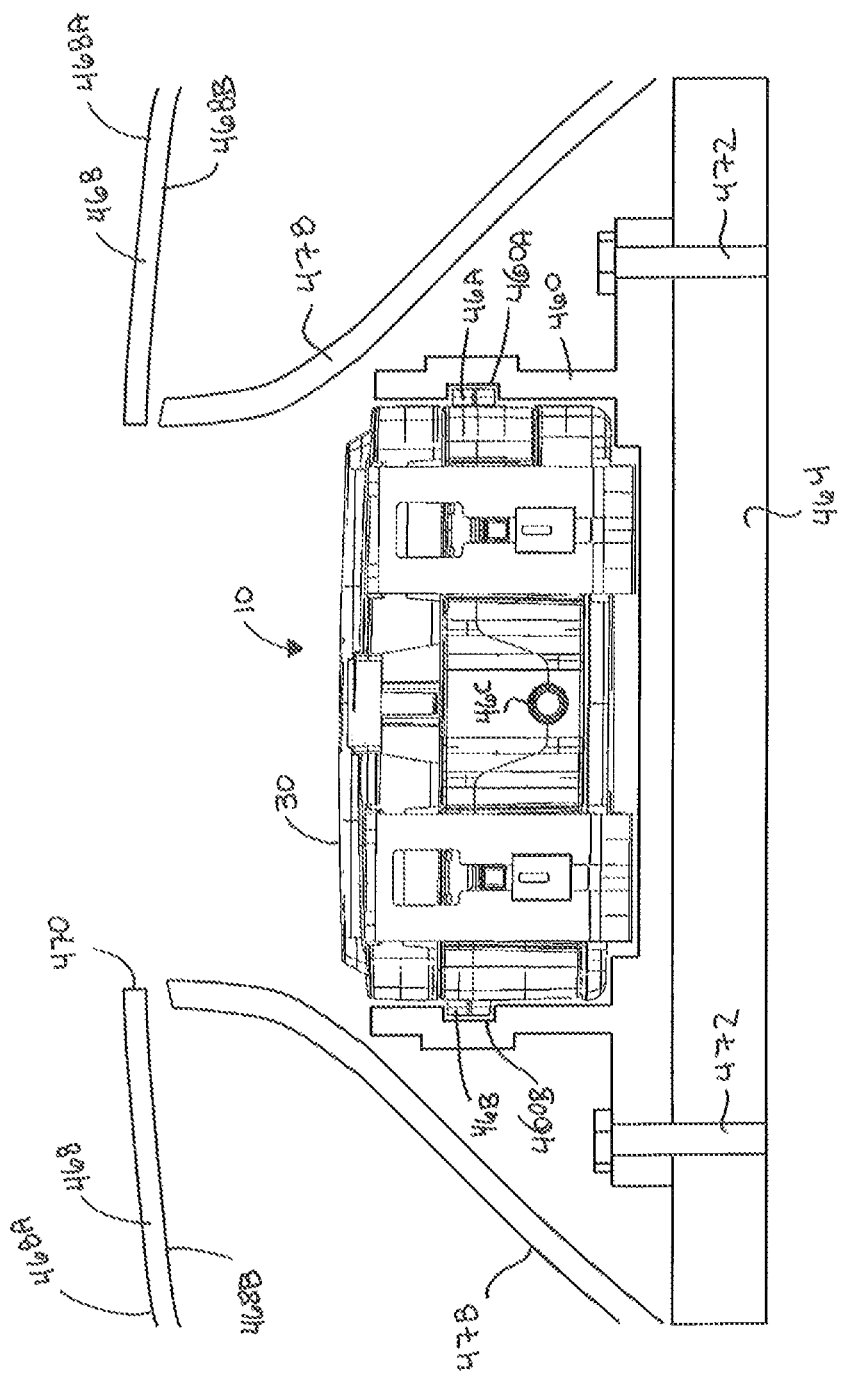
FIG. 7 is a top view of a mounted radar unit according to yet another aspect of the invention.

FIG. 7 illustrates a third mounting arrangement where the radar unit 10 is prominently displayed within a body panel 468 (e.g., a panel, a grill, a fascia). More specifically, the front cover 30 and the indicia 6 (see FIG. 1) located thereon are prominently displayed within the body panel 468 when viewed from outside of the vehicle. As shown, the body panel 468 includes an external side 468A (visible from outside the vehicle) and an internal side 468B. The body panel 468 further includes an aperture 470 sized to permit viewing of at least a portion of the front cover 30 of the radar unit 10 from the external side 468A of the panel 468. The radar unit 10 is attached to a bracket 460 by engaging the bracket 460 with at least some of the cylindrical posts 46A, 46B, 46C that are located on the radar unit 10. The bracket 460 flexes to extend around the posts 46A, 46B, 46C and receives the posts within similarly sized cutouts or mounting points 460A, 460B. The bracket 460 is mounted to a structural member 464 (e.g., bumper beam) located behind the body panel 468 (e.g., a panel, a grill, a fascia, etc.) via fasteners 472 (e.g., threaded fasteners). As shown, a gap exists between the panel 468 and the radar unit 10 (though not necessarily shown to scale). A shroud or aesthetic cover 478 extends around the side of the radar unit 10 to at least partially bridge the gap so that the gap is less visible. However, the shroud 478 does not extend across or cover the front cover 30.

Figure 8:
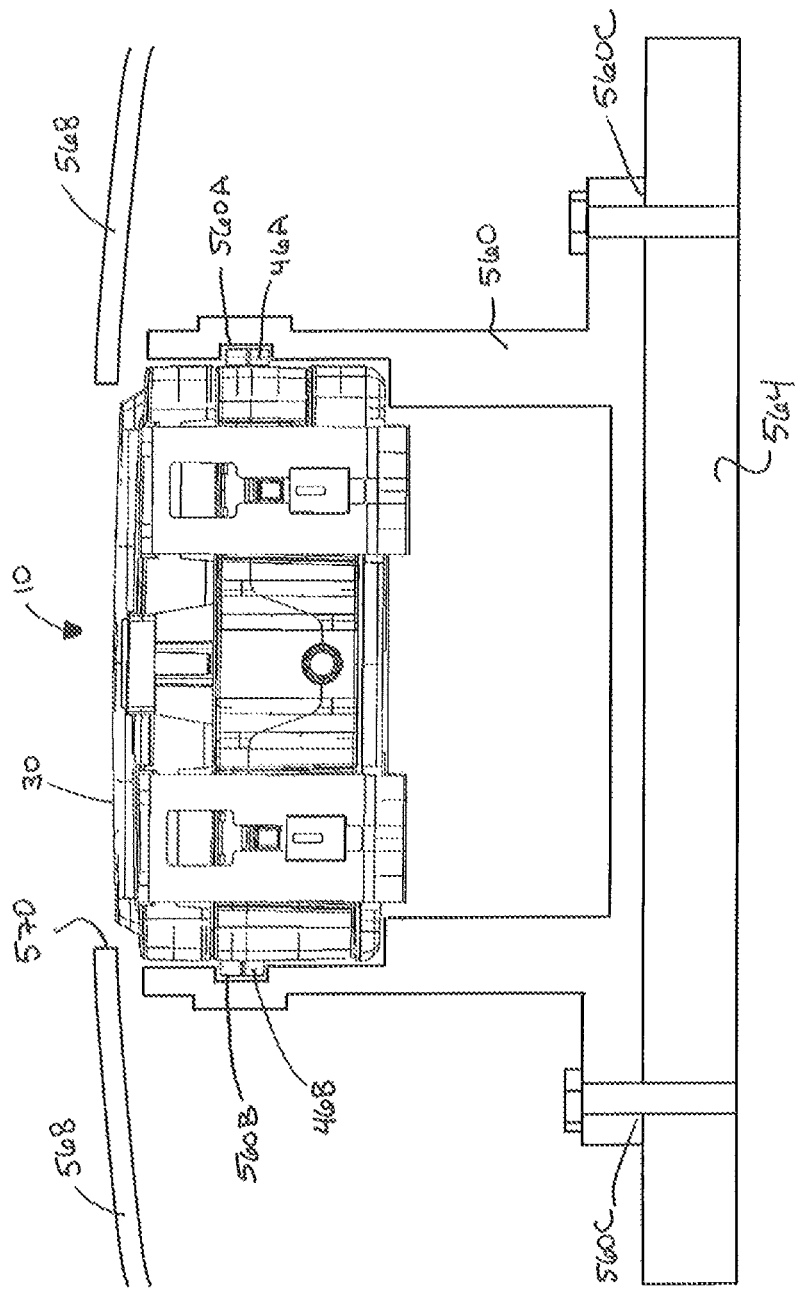
FIG. 8 is a top view of a mounted radar unit according to yet another aspect of the invention.

FIG. 8 illustrates a fourth mounting arrangement, similar to the third mounting arrangement described above with respect to FIG. 7. The fourth mounting arrangement maintains the mounting relationship between the radar unit 10 and the structural member 564 via a bracket 560, but the bracket 560 is modified (relative to the bracket 460) to increase the distance between the mounting points 560C (i.e., for connecting the bracket 560 to the structural member 564) and the cutouts or mounting points 560A, 560B (i.e., for connecting the bracket 560 to the radar unit 10). The extended length moves the radar unit 10 closer to the aperture 570 in the body panel 568 to decrease a gap size between the radar unit 10 and the body panel 568 such that an aesthetic cover is not needed.

The mounting arrangements described above locate the radar unit 10 within an aperture or opening 270, 370, 470, 570 (or visible directly through the opening) within a body panel 268, 368, 468, 568 without the body panel 268, 368, 468, 568 extending across the radar unit 10, or more particularly, without the body panel 268, 368, 468, 568 extending across the front cover 30 of the radar unit 10. Therefore, the indicia 6 located on the front cover 30 is fully visible from outside the vehicle. A radome is not employed in front of the radar unit 10, thereby reducing the number of parts used in installation, and likewise reducing the time needed to install and calibrate the radar unit 10.

Various features and advantages of the invention are set forth in the following claims.

What is claimed is:

1. A vehicular system comprising:
   a body panel having an aperture; and
   a radar unit at least partially aligned with the aperture, the radar unit including a housing encapsulating a printed circuit board operable to generate radar waves, the housing including a first wall through which the radar waves are directed;
   wherein the first wall of the housing is visible within the aperture and the body panel does not extend across the first wall,
   wherein an exterior surface of the first wall of the radar unit is provided with an indicia, and
   wherein the exterior surface of the first wall is a flat surface interrupted by the indicia, wherein the indicia is formed in or on the flat surface such that the exterior surface of the first wall is non-planar.

2. The vehicular system of claim 1, wherein the body panel includes recesses and the radar unit includes posts, and wherein the posts of the radar unit are operable to engage the recesses of the body panel to mount the radar unit relative to the body panel.

3. The vehicular system of claim 1, further comprising a bracket having a plurality of mounting points, wherein the bracket is mounted to the body panel at one or more of the plurality of mounting points, and wherein the bracket is mounted to the radar unit at one or more of the plurality of mounting points.

4. The vehicular system of claim 1, further comprising:
   a structural member located behind the body panel;
   a bracket mounted to the structural member, the bracket including a plurality of mounting points attachable to the radar unit.

5. The vehicular system of claim 4, further comprising a shroud extending at least partially across a gap between the structural member and the body panel.

6. The vehicular system of claim 1, wherein the housing further includes a plurality of spring clips and a second wall opposite the first wall, wherein the plurality of spring clips extend around the first wall and the second wall to hold the first wall relative to the second wall.

7. The vehicular system of claim 6, further comprising a sub-carrier located between the first wall and the second wall.

8. The vehicular system of claim 1, wherein the printed circuit board is first printed circuit board, wherein the radar unit further includes a second printed circuit board in communication with the first printed circuit board, wherein the housing further includes a vehicle connector port, and wherein the second printed circuit board is operable to communicate with a vehicle electronic control unit via the vehicle connector port.

9. The vehicular system of claim 1, wherein the housing includes a first housing portion and a second housing portion, the first and second housing portions being releasably attached to one another.

10. The vehicular system of claim 9, further comprising a third housing portion located between the first and second housing portions.

11. The vehicular system of claim 10, wherein the third housing portion includes a plurality of mounting posts extending outward therefrom.

12. The vehicular system of claim 9, wherein the first housing portion is configured to permit radar waves to pass therethrough.

13. The vehicular system of claim 1, wherein the indicia is formed by one of molding, engraving, or embossing.

14. The vehicular system of claim 1, wherein the indicia is one or more of a logo corresponding to the manufacturer of the radar unit, a logo corresponding to a vehicle make or model, a text or an image denoting a trim level or engine specification of a vehicle, or a text or an image denoting the function of the radar unit.

15. The vehicular system of claim 1, wherein the indicia is colored relative to the front cover.

\* \* \* \* \*